(12) United States Patent
Ghosh et al.

(10) Patent No.: US 8,942,336 B2
(45) Date of Patent: Jan. 27, 2015

(54) ROBUST SENSING OF DVB-T/H TRANSMISSIONS

(75) Inventors: Monisha Ghosh, Chappaqua, NY (US); Vasanth Gaddam, Tarrytown, NY (US)

(73) Assignee: Koninklijke Philips N.V., Eindhoven (NL)

(*) Notice: Subject to any disclaimer, the term of this patent is extended or adjusted under 35 U.S.C. 154(b) by 368 days.

(21) Appl. No.: 13/319,808

(22) PCT Filed: Apr. 23, 2010

(86) PCT No.: PCT/IB2010/051797
§ 371 (c)(1),
(2), (4) Date: Nov. 10, 2011

(87) PCT Pub. No.: WO2010/131138
PCT Pub. Date: Nov. 18, 2010

(65) Prior Publication Data
US 2012/0057030 A1  Mar. 8, 2012

Related U.S. Application Data

(60) Provisional application No. 61/178,231, filed on May 14, 2009.

(51) Int. Cl.
*H04L 7/00* (2006.01)
*H04N 5/44* (2011.01)
(Continued)

(52) U.S. Cl.
CPC .......... *H04N 5/4401* (2013.01); *H04L 27/0006* (2013.01); *H04N 21/438* (2013.01); *H04N 21/6112* (2013.01); *H04L 5/0007* (2013.01)
USPC ........... 375/367; 375/137; 375/260; 375/285; 375/349; 375/368

(58) Field of Classification Search
CPC . H04L 27/2647; H04L 5/0007; H04L 5/0048; H04L 25/0232; H04L 25/0057
USPC ......... 375/130, 132–137, 259–260, 316, 322, 375/324–327, 334, 340, 342, 343, 346, 348, 375/349, 354, 362, 364–368
See application file for complete search history.

(56) References Cited

U.S. PATENT DOCUMENTS 5,644,486 A * 7/1997 Chang et al. ................ 700/3
6,330,293 B1 * 12/2001 Klank et al. ................ 375/344
(Continued)

FOREIGN PATENT DOCUMENTS

EP  0786889 A1  7/1997
GB  2447972 A   1/2008

OTHER PUBLICATIONS

R. Mhiri et al., "Synchronization for a DVB-T Receiver in Presence of Co-Channel Interference", 13th IEEE International Symposium on Personal, Indoor and Mobile Radio Communications, vol. 5, Sep. 15, 2002-Sep. 18, 2002 pp. 2307-2311.
(Continued)

*Primary Examiner* — Sam K Ahn
*Assistant Examiner* — James M Perez
(74) *Attorney, Agent, or Firm* — Larry Liberchuk

(57) ABSTRACT

A method and system is provided for detecting the presence of a DVB (digital video broadcasting) transmission. The method includes receiving an RF (radio frequency) signal in a selected channel (1101); creating signal samples from the received RF signal (1102); creating averaged samples from the signal samples, each averaged sample being an average of a predetermined number of signal samples that are separated by a minimum pilot pattern repetition period from one to the next signal sample (1103); correlating the averaged samples with a reference sequence (1104); and comparing a correlation result with a threshold correlation value (1105).

13 Claims, 6 Drawing Sheets

(51) Int. Cl.
*H04L 27/00* (2006.01)
*H04N 21/438* (2011.01)
*H04N 21/61* (2011.01)
*H04L 5/00* (2006.01)

(56) References Cited

U.S. PATENT DOCUMENTS

| | | | |
|---|---|---|---|
| 2002/0110283 A1* | 8/2002 | Fan et al. | 382/264 |
| 2002/0144294 A1* | 10/2002 | Rabinowitz et al. | 725/139 |
| 2005/0013274 A1* | 1/2005 | Pekonen et al. | 370/329 |
| 2005/0143974 A1* | 6/2005 | Joly | 704/201 |
| 2005/0182620 A1* | 8/2005 | Kabi et al. | 704/216 |
| 2007/0098089 A1* | 5/2007 | Li et al. | 375/260 |
| 2008/0008258 A1* | 1/2008 | Tanabe | 375/267 |
| 2008/0151980 A1* | 6/2008 | Lindoff et al. | 375/226 |
| 2008/0181291 A1* | 7/2008 | Zhou et al. | 375/227 |
| 2008/0304587 A1* | 12/2008 | Setoh et al. | 375/260 |
| 2009/0180558 A1* | 7/2009 | Ma et al. | 375/260 |
| 2010/0040091 A1* | 2/2010 | Kamalizad et al. | 370/503 |

OTHER PUBLICATIONS

Danijela Cabric et al., "Spectrum Sensing Measurements of Pilot, Energy, and Collaborative Detection" IEEE Military Communications Conference MILCOM 2006, Oct. 23, 2006, pp. 1-7.

* cited by examiner

ROBUST SENSING OF DVB-T/H TRANSMISSIONS

This application claims the benefit of U.S. Provisional Application No. 61/178,231 filed on May 14, 2009.

The invention generally relates to devices in a Cognitive Radio (CR) network, and more particularly, to a method and system which senses digital video broadcasting (DVB) transmissions.

New spectrum policies being adopted by the regulatory bodies envision the operation of unlicensed secondary devices in the frequency bands designated for licensed operation. The secondary devices can operate only when that band is vacant or not being used by a primary device. This implies that the secondary devices have to vacate the band when a primary device starts transmission in order to minimize the amount of interference the secondary devices would cause to the primary devices. The secondary devices are also referred to as Cognitive Radios (CR) due to their ability to sense the environment and adapt accordingly. The UHF (ultra high frequency) band allocated for television broadcasting is an ideal candidate for allowing the operation of CR devices.

In the US, in order to avoid interference to or from broadcasts from neighboring markets and/or transmissions, only some of the TV bands can be used in any given geographical location. As a result, the remaining TV bands are largely unused and therefore can be utilized for other purposes (such as in-home networking, etc). Other regulatory domains also have similar allocation of TV channels.

To avoid harmful interference to digital television (DTV) reception by, for example, CR devices, regulatory bodies have stipulated reliable detection of DTV signals at signal strengths as low as −114 dBm. Thus the CR devices should sense the channel for primary transmissions before they can use that particular channel. This requirement mandates that the CR devices implement robust sensing algorithms to detect the presence of DTV (DVB-T/H) (Digital Video Broadcasting—Terrestrial/Handheld) signals.

However, unlike the 8-VSB (8-level vestigial sideband) ATSC (Advanced Television Systems Committee) signal which has a single pilot at a known location in the frequency domain, a DVB-T signal has a number of lower-power pilots distributed in the frequency domain. Hence the approach of filtering in the frequency domain in order to detect the pilots is not feasible for DVB-T. Instead, a better approach would be to correlate in the time domain with a known time domain signal representing the frequency domain pilots.

Existing sensing algorithms for the detection of DVB-T and DVB-H signals work well only with a sub-set of transmission modes. According to embodiments herein, a sensing algorithm improves the detection performance and performs equally well for all the transmission modes.

Most OFDM (orthogonal frequency division multiplexing) signals, such as those used to transmit digital television using DVB-T, have pilots in the frequency domain for channel estimation and synchronization. There are two kinds of pilot signals embedded into the data stream: (1) fixed pilots, whose values and locations are fixed and (2) variable pilots whose values are fixed but the locations change from symbol to symbol, sometimes repeating in a known pattern. Both kinds can be used for sensing, depending on the degree of desired complexity. The fundamental approach taken here is to view these pilots in the time domain as a continuous known sequence that is embedded into the data sequence and to correlate the received signal with this known sequence. Since DVB-T has a number of different FFT (Fast Fourier Transform) sizes and cyclic prefixes, a different reference signal is generated for each mode and correlated against each to determine the type of signal present.

In one example embodiment of the invention, a method is provided for detecting the presence of a DVB (digital video broadcasting) transmission. The method includes receiving an RF (radio frequency) signal in a selected channel; creating signal samples from the received signal; creating averaged samples from the signal samples, each averaged sample is an average of a predetermined number of signal samples that are separated by a minimum pilot pattern repetition period from one to the next signal sample; correlating the averaged samples with a reference sequence; and comparing a correlation result with a threshold correlation value.

In another example embodiment of the invention, a system is provided for detecting the presence of a DVB transmission. The system includes an RF front-end module for receiving an RF signal; a sampling module for creating signal samples from the received RF signal; a buffer for holding the signal samples; an accumulating/averaging module for creating averaged samples from the signal samples, each averaged sample is an average of a predetermined number of signal samples that are separated by a minimum pilot pattern repetition period from one to the next signal sample; a memory module for storing a reference sequence; a correlator for correlating the averaged samples with the reference sample; and a threshold detection module for comparing a correlation result with a threshold correlation value.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
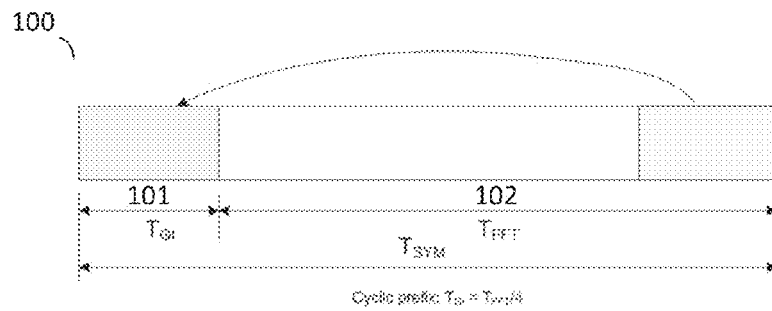
FIG. 1 illustrates an OFDM symbol with cyclic prefix (CP).

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Brief Overview of DVB-T Transmission Specification

The terrestrial Digital Video Broadcasting (DVB-T) has been standardized by the European Telecommunications Standards Union (ETSI) for the terrestrial broadcasting of digital TV. The DVB-T standard uses an orthogonal frequency division multiplexing (OFDM) modulation scheme and provides options to adapt the coding and modulation parameters according to broadcaster's requirements. The DVB-T specification provides two modes of operations: namely, the '2K mode' and the '8K mode'. In addition, the DVB-H enhancement provides the '4K mode'. The modes are defined based on the FFT (Fast Fourier Transform) size used to generate the transmitted signals. Some of the parameters for each of these modes are listed in Table 1.

TABLE 1

DVB-T Parameters for 8K and 2K mode

| Parameter | 8K mode | 2K mode |
| --- | --- | --- |
| Number of carriers K | 6817 | 1705 |
| Value of carrier number $K_{min}$ | 0 | 0 |
| Value of carrier number $K_{max}$ | 6816 | 1704 |
| Duration $T_U$ | 896 µs | 224 µs |
| Carrier Spacing $1/T_U$ | 1116 Hz | 4464 Hz |
| Spacing between carriers $K_{min}$ and $K_{max}$ $(K-1)/T_U$ | 7.61 MHz | 7.61 MHz |

The DVB-T transmitted signal is organized in frames. Each frame consists of 68 OFDM symbols and four such frames make up a super-frame. As shown in FIG. 1, an OFDM symbol 100 consists of two parts: a useful symbol period 102 and a guard interval 101. A portion of the useful symbol is transmitted in guard interval 101 (referred to as cyclic prefix (CP)), and this feature is used to minimize the inter-symbol interference. The DVB-T specification provides a choice of ¼, ⅛, ¹⁄₁₆ or ¹⁄₃₂ of the symbol period for the guard interval.

In addition to the CP, the DVB-T standard provides the following reference signals to assist in the synchronization, demodulation and decoding of the signal.

Continual pilots—These reference signals are placed at fixed sub-carriers locations, and their location does not vary from symbol to symbol. There are 45 continual pilots in the '2K mode' and 177 continual pilots in the '8K mode'.

Figure 2:
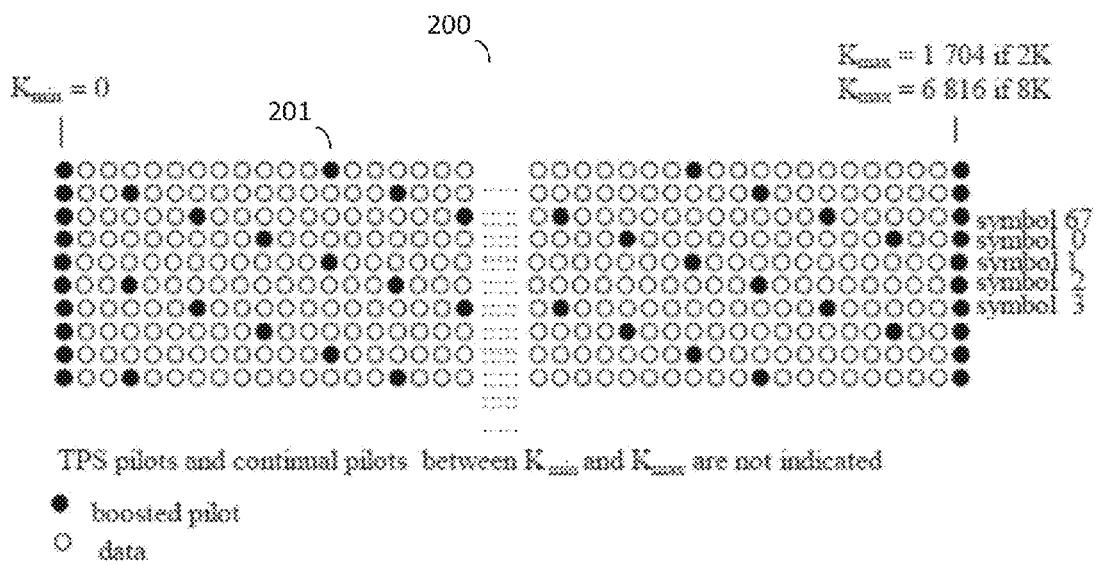
FIG. 2 illustrates the location of scattered pilot sub-carriers in DVB-T OFDM symbols.

Scattered pilots—These reference signals 201 (FIG. 2) are distributed evenly (every $12^{th}$ sub-carrier) in the OFDM symbol. The location of these pilots is offset by three sub-carriers on each OFDM symbol and as a result, the pilot pattern repeats every four OFDM symbols in frame 200, as shown FIG. 2. The scattered pilots are used to derive the channel estimate assuming that the channel is quasi-static.

TPS pilots—These Transmission Parameter Signaling (TPS) reference signals are used to carry the transmission parameters. A fixed set of 17 sub-carriers for the '2K mode' and 68 sub-carriers for the '8K mode' has been designated as TPS pilot sub-carriers. All the TPS pilot sub-carriers in an OFDM symbol carry the same information.

The continual pilots and scattered pilots are transmitted at a higher power level (~2.5 dB) compared to the rest of the sub-carriers.

DVB-T Signal Detection Methods

Energy Based Detection Schemes

Detecting the presence of signal energy in the channel of interest is usually very fast and provides a good indication of channel occupancy. This method however does not provide any information about the signal itself, and therefore it cannot distinguish between a primary signal and a secondary signal. In addition, the probability of detection varies significantly with the thresholds. As a result, extreme care has to be taken while determining the threshold value to be used, especially while detecting signals with low signal to noise ratios (SNR).

Feature Based Detection Schemes

Feature based detection schemes rely on the unique features of the incumbent signals (such as training signals, pilot patterns, etc.) for detection. As mentioned earlier, the DVB-T signal has some unique features in terms of the cyclic prefix, continual and scattered pilots, etc., which can be used in the detection process.

Time Domain Auto-Correlation

In time domain auto-correlation, the CP feature of the DVB-T signal is used to determine the presence or absence of the signal in the channel. The received signal is correlated with a delayed version of the signal as shown in the following equation:

$$R_{xx}(n) = \sum_{m=n}^{n+N_{GI}-1} x(m) x^*(m+N_{FFT}) \quad (1)$$

Where $x(m)$ is the sampled received signal in the time-domain and $R_{xx}(n)$ is the auto-correlation of $x(m)$. $N_{FFT}$, $N_{GI}$ and $N_{SYM}$ represent the FFT, CP and OFDM symbol lengths respectively.

Since a portion of the useful OFDM symbol is repeated in CP, correlating as above will give a peak that repeats periodically. The peak amplitude with an optional combination with peak periodicity can be used to detect the presence of DVB-T signals in the channel of interest.

Let $\overline{R}_{xx}$ the peak value of $|R_{xx}(n)|^2$ defined as $$\overline{R}_{xx} = \max_n(|R_{xx}(n)|^2) \quad (2)$$

Then $\overline{R}_{xx}$ is compared against a pre-defined threshold, $T_{xx}^{CP}$, to determine the presence of the signal.

$\overline{R}_{xx} > T_{xx}^{CP}$ signal present otherwise signal absent (3)

The threshold is determined based on the desired false alarm probability.

Figure 3:
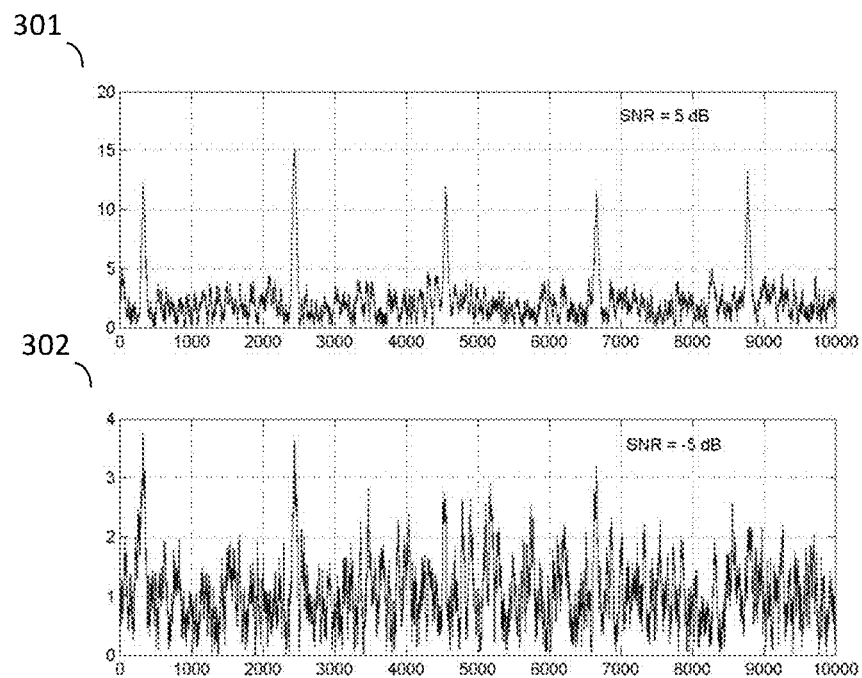
FIG. 3 illustrates the correlation on CP for 2K, 1/32 mode with SNRs of 5 dB and −5 dB.

The auto-correlation based detector performs very well for high SNR values. However, for moderate and low SNRs values (i.e., below 0 dB) the performance may not be very reliable. In addition, the performance depends significantly on the CP length. As a result, the detector performs well for the 8K mode with ¼ GI and very poorly for the 2K mode with ¹⁄₃₂ GI. The detector, however, is robust to frequency offsets. FIG. 3 shows the auto-correlation plots 301, 302 for the 2K, ¹⁄₃₂ mode with SNRs of 5 dB and −5 dB. It can be observed that for SNR=−5 dB, the correlation peaks are not clearly distinguishable and as a result the detector's performance degrades (see plot 302).

Time Domain Cross-Correlation

In the time domain cross-correlation method, the continual and scattered pilots in the DVB-T signal are used to detect the signal. As described in the previous section, a sub-set of the carriers are designated as pilot sub-carriers. These carriers carry known information and these carriers are transmitted at higher power (by about 2.5 dB) compared to the data carriers. The received signal can be correlated with a reference sequence which is derived by taking an inverse Fourier transform of a vector composed of only the pilot sub-carriers. Since the SP pattern repeats every four symbols, forming four such reference signals $s_d^P(n)$ is shown below $$s_d^P(n) = \sum_{k \in \Psi_{P,d}} C_{k,d} e^{\frac{j2\pi kn}{N_{FFT}}}, \quad (4)$$

where $s_d^P(n)$ represents the time-domain sequence, d represents the pilot pattern number and takes the values 1 to 4. $\Psi_{P,d}$ represents the set of pilot sub-carriers locations for pilot pattern number d. The set of pilot sub-carriers could only be those corresponding to scattered pilot locations or a combined set of scattered and continual pilot locations. For example, for the case of SP, $\Psi_{P,1} = \{0, 12, 24, \ldots\}$. $C_{k,d}$ represents the symbol for sub-carrier k and pattern number d.

Another reference sequence can also be generated by combining the above four reference sequences as shown below:

$$s_{comb}^P(n) = s_1^P(n) + s_2^P(n - N_{FFT}) + s_3^P(n - 2N_{FFT}) + s_4^P(n - 3N_{FFT}), \quad (5)$$

where n=0 to $(4N_{FFT} - 1)$.

The correlation output is given by the following equation:

$$R_{xp,d}(n) = \sum_{m=0}^{N_{FFT}-1} x^*(n+m) s_d^P(m) \quad (6)$$

In ideal conditions, the correlator output $R_{xp,d}(n)$ would have a peak magnitude that repeats every $4T_{SYM}$ samples.

A similar equation for the correlation output can be derived for the case when $s_{comb}^P(n)$ is used as a reference sequence as shown below $$R_{xp,comb}(n) = \sum_{d=1}^{4} \sum_{m=0}^{N_{FFT}-1} x^*(n + (d-1)*N_{SYM} + m) s_d^P(m) \quad (7)$$

In the rest of this section, $R_{xp,1}(n)$ to derive detection metrics will be considered. The analysis can be extended to all the correlation outputs derived previously.

Let $\overline{R}_{xp,1}$ represent the peak value of $|R_{xp,1}(n)|^2$ defined as $$\overline{R}_{xp,1} = \max_n (|R_{xp,1}(n)|^2) \quad (8)$$

Then $\overline{R}_{xp,1}$ is compared against a pre-defined threshold, $T_{xp}^P$, to determine the presence of the signal.

$\overline{R}_{xp,1} > T_{xp}^P$ signal present otherwise signal absent (9)

The cross-correlation based detector performs very well in different channel environments even for low SNR values. In addition, the detector performance is independent of transmission mode and therefore performs equally well for the 2K mode, as well as the 8K mode.

Figure 4:
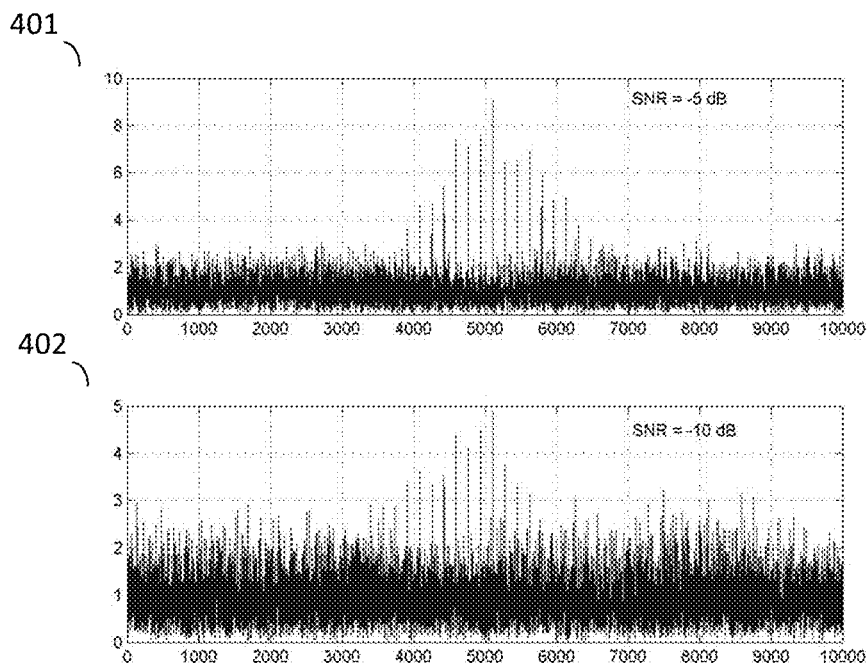
FIG. 4 illustrates the correlation on pilots for 2K, 1/32 mode with SNRs of −5 dB and −10 dB.

FIG. 4 shows the correlator output 401, 402 for the 2K, 1/32 transmission mode for SNRs of −5 dB and −10 dB. $s_1^P(n)$ was used as the reference sequence. It can be observed from the plots 401 and 402 that the performance of the cross-correlation based detector is better compared to that of the auto-correlation based detector.

Method to Detect DVB-T Signals

Following are example embodiments describing advanced algorithms to improve the detector's performance.

Since the DVB-T deployments are static, it is assumed that the channel bandwidth and the transmission mode (FFT size and GI duration) information are available to the detector. In cases where transmission mode information is not available, the detector can cycle through the different transmission modes to sense for DVB-T signals. This would result in increased detection time, but the detection performance remains substantially the same.

Improved Detection by Data Smoothing (Reducing Noise Variance)

Referring to Equation (6), it can be observed that the correlation output contains a noise term (contributions from data sub-carriers and WGN). In one example embodiment of the invention, the variance of the noise term can be reduced by averaging the received symbols. However, the detector does not know the symbol boundaries. Assuming that the transmission mode and GI duration are known, then the minimum pilot pattern repetition period (PPRP) can be derived using the following equation $N_{PPRP} = N_{GI} * N_{SYM}$. Alternatively, the minimum PPRP can be derived using the equation $N_{PPRP} = 4*B*N_{SYM}$, where B is an integer. Using this fact, the received samples are averaged, as shown below $$x_L(n) = \frac{1}{L} \sum_{l=0}^{L-1} x(n - l*N_{PPRP}) \quad (10)$$

$$n = 0, 1, \ldots, N_{PPRP} - 1,$$

where L is a design parameter and is dependent on the sensing time and the desired performance.

The averaged samples $x_L(n)$ are correlated with reference sequences as follows:

$$R_{xp,d}^L(n) = \sum_{m=0}^{N_{FFT}-1} x_L^*(n+m) s_d^P(m) \quad (11)$$

$$n = 0, 1, \ldots, N_{PPRP}$$

Any range, equal to $4*N_{SYM}$ samples within $[0, N_{PPRP}-1]$ can be used to determine the maximum peak magnitude. Additional peak magnitudes can also be derived and verified if the consistency of the peak location is used to improve the robustness of the detector.

Let $\overline{R}_{xp,1}^L$ represent the peak value of $|R_{xp,1}^L(n)|^2$ defined as $$\overline{R}_{xp,1}^L = \max_n (|R_{xp,1}^L(n)|^2) \quad (12)$$

Then $\overline{R}_{xp,1}{}^L$ is compared against a pre-defined threshold, $T_{xp}{}^{P,L}$, to determine the presence of the signal.

$$\overline{R}_{xp,1}{}^L > T_{xp}{}^{P,L} \text{ signal present}$$

otherwise signal absent (13)

Figure 5:
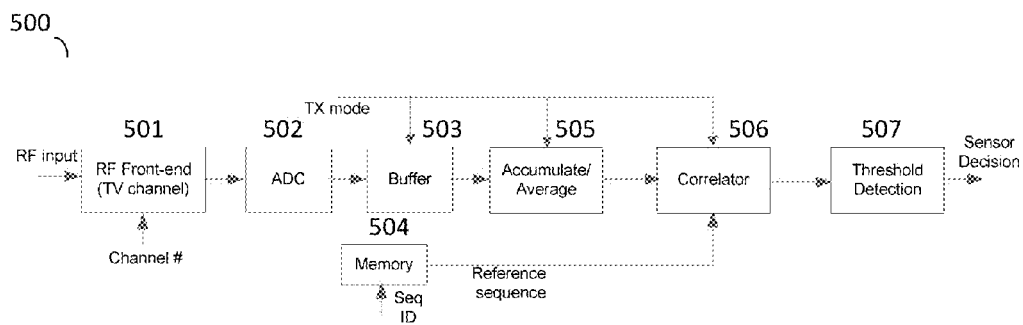
FIG. 5 illustrates a block diagram of a DVB-T detector using data smoothing in one embodiment of the invention.
Figure 6:
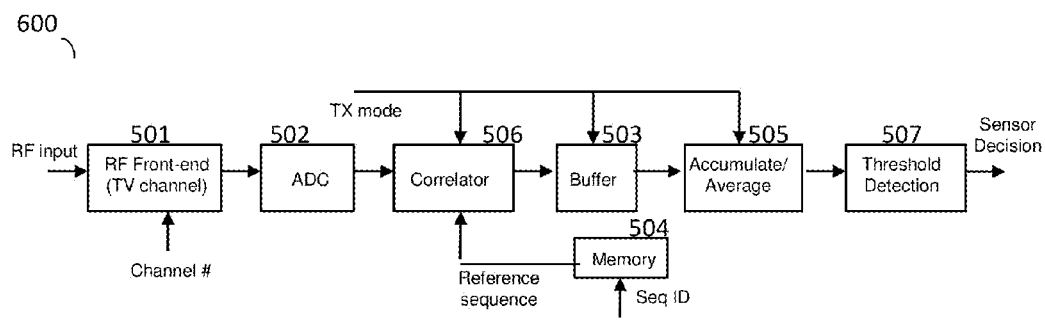
FIG. 6 illustrates a block diagram of a DVB-T detector using data smoothing in another embodiment of the invention.

FIG. 5 shows a simplified block diagram of a DVB-T detector 500 using data smoothing. The RF front-end 501 down-shifts the RF signal to an intermediate frequency (IF). The IF signal is then down-shifted to DC (alternatively, the IF signal can be downshifted to DC in the digital domain, i.e. after ADC). The signal is then digitized by an analog to digital converter (ADC) 502. The sampled signal is then processed according to the methods described above, using the modules buffer 503, accumulate/average 505 and correlator 506. The buffer 503, accumulate/average 505 and correlator 506 modules operate based on a particular transmission mode, and the detector can operate on different transmission modes. An alternate arrangement 600, as shown in FIG. 6, is that the correlator 506 is placed before the buffer 503, so that the correlation is performed before the buffering, accumulating and averaging. The signal 'seq ID' determines the reference sequence, which is generated from pilots and is stored in memory 504, to be used for correlation. This signal is also used by the 'Threshold Detection' module 507 to determine the thresholds to be used. The output of the correlator is compared against the selected threshold to determine the presence/absence of a DVB-T signal.

Figure 7:
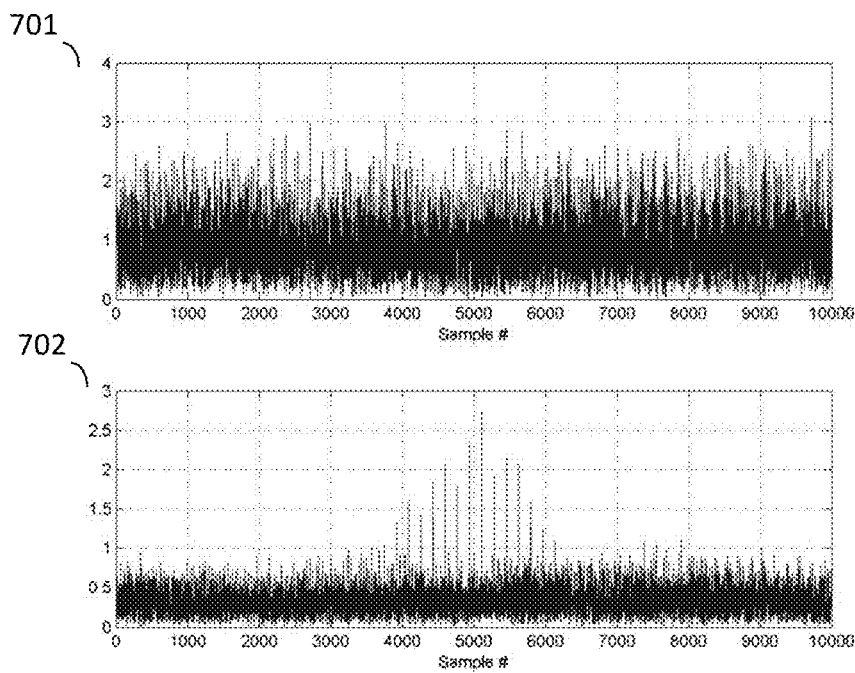
FIG. 7 illustrates a comparison of correlation plot without (top) and with (bottom) data smoothing for 2K, 1/32 mode with an SNR of −15 dB and L=8.

FIG. 7 shows the effect of data smoothing on the correlation output. The correlation outputs without data smoothing 701 and with data smoothing 702 demonstrate that the peaks are distinctly visible when the data is smoothed as described earlier, and therefore the detector is able to detect the DVB-T signals even for SNRs below −15 dB.

Figure 8:
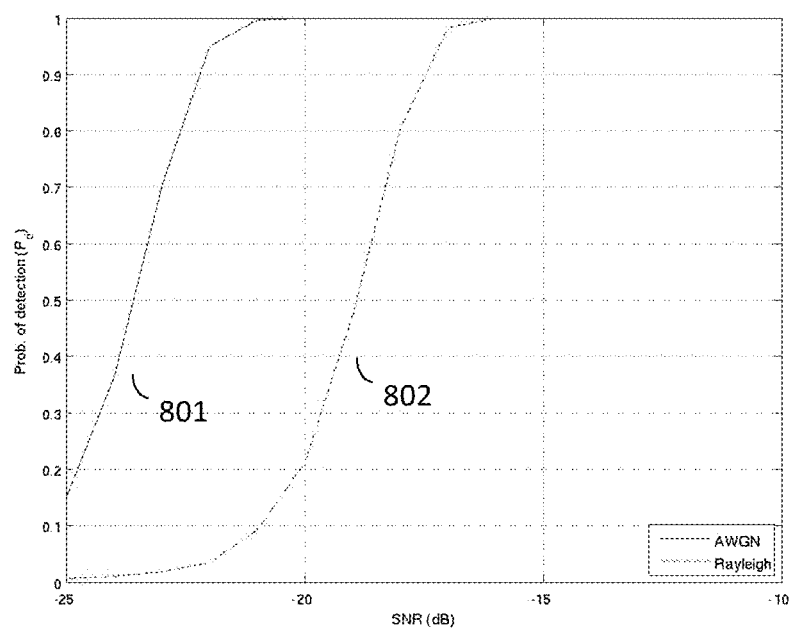
FIG. 8 illustrates the performance of the improved detector in an AWGN and Rayleigh faded channel for 2K, 1/32 mode.
Figure 9:
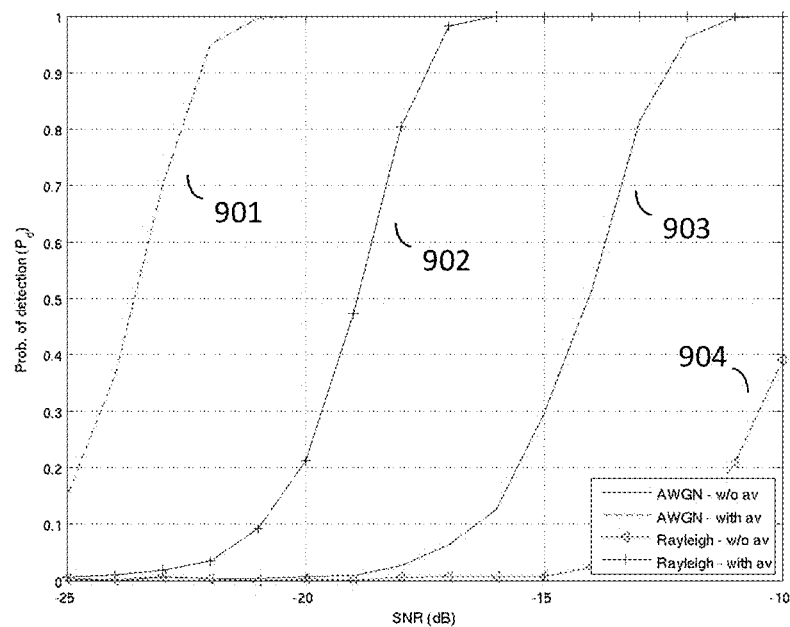
FIG. 9 illustrates a comparison of the performance of a standard (without data smoothing) and the robust (with data smoothing) in an AWGN and Rayleigh faded channel for 2K, 1/32 mode.

The performance of the proposed algorithm was evaluated through simulations in AWGN and multi-path channel. The following simulation parameters were used:
Transmission mode—2K, 1/32
Number of runs for each SNR—1000,
Smoothing factor L—8 (~60 ms sensing time)
Probability of false alarm ($P_{FA}$)—<0.01
Channels: AWGN or Rayleigh faded FIG. 8 shows the probability of detection ($P_d$) vs. SNR curves for the proposed detector in the AWGN channel 801 and Rayleigh channel 802. FIG. 9 shows the $P_d$ vs. SNR curves for the example embodiment detector (AWGN with averaging 901, Rayleigh with averaging 902) described herein and the standard detector (AWGN without averaging 903, Rayleigh without averaging 904). It can be observed that the proposed detector can robustly detect DVB-T signals even below −15 dB for different channel conditions.

In addition to the peak magnitude, consistency in the periodicity of the peak can also be used to improve the detector's robustness. According to an example embodiment of the invention, in the cross-correlation based method using $s_d{}^P(n)$ as a reference sequence, the correlation peak would repeat every $4*N_{SYM}$ samples in the presence of a DVB-T signal. Therefore, the difference in the position of the maximum peak $\overline{R}_{xp,d}(l)$ on each block of $4*N_{SYM}$ samples is calculated as shown below $$D(l) = \text{abs}(\overline{R}_{xp,d}(l) - \overline{R}_{xp,d}(l-1)) l \geq 2 \quad (14)$$

If the value of $D(l) < D_{threshold}$ then a DVB-T signal is present. The value of $D_{threshold}$ could be set to a fixed value such as 10 (symbols) or may be set by the device based on the operating environment of the CR device.

Quiet-Period (QP) Sensing

In an example embodiment, in order to maintain quality of service (QoS) requirements of an application, a cognitive radio will not be able to cease its transmission for a continued period of time. Instead, a CR device will schedule short quiet periods (QPs) more frequently. In this example embodiment, the data smoothing equation is modified as shown below.

$$x_L(n) = \frac{1}{L} \sum_{l=0}^{L-1} x(n - l * N_{PPRP}) \quad (15)$$

$$n = 0, 1, \ldots, N_{QP} - 1$$

where $N_{QP}$ corresponds to the number of samples that can accommodated in the given quiet period. $N_{QP}$ could take the values $4*N_{SYM}$, $8*N_{SYM}$, $12*N_{SYM}$ …, or $N_{PPRP}$, depending on the QP duration. It is assumed that the sample counters are active during non-QPs. In some situations, a continuous set of samples equal to $N_{QP}$ and corresponding to the desired range cannot be captured in a given QP. In those cases, the samples can be discarded and the process continued with the next QP.

In another example embodiment of the invention, the implementation complexity associated with the cross-correlation can be reduced by modifying the equation as shown below $$R_{xp,d}^L(n) = \sum_{m=0}^{N_{FFT}-1} \text{sgn}(x_L^*(n+m))\text{sgn}(s_d^P(m)) \quad (16)$$

$$n = 0, 1, \ldots, N_{PPRP}$$

Figure 10:
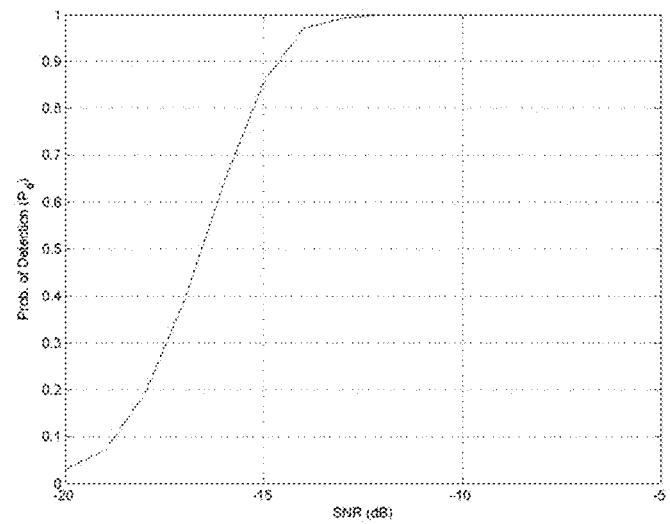
FIG. 10 illustrates the performance of the DVB-T detector using the simplified cross-correlator.

The product operation in the summation can be implemented as a simple logic operation and therefore reduces the gate count significantly compared to a multiplier. FIG. 10 shows the performance of a DVB-T/DVB-H detector using cross-correlation as defined in Equation (16).

Figure 11:
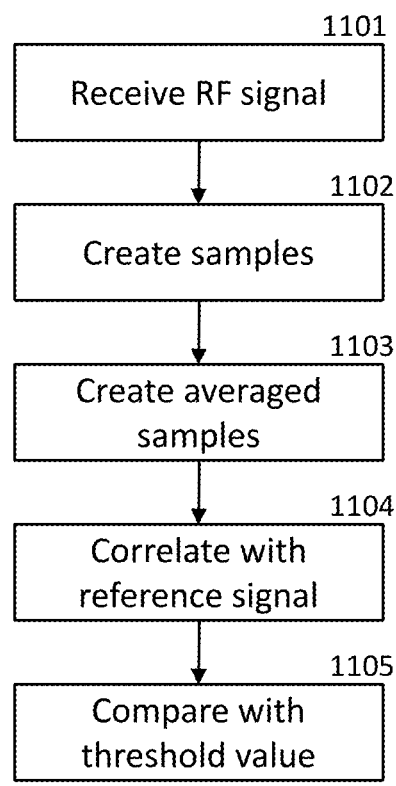
FIG. 11 illustrates a process for detecting the presence of a DVB signal.

FIG. 11 shows the process of detecting the presence of a DVB according to an example embodiment. The process includes: receiving an RF (radio frequency) signal in a selected channel 1101; creating signal samples from the received signal 1102; creating averaged samples from the signal samples, each averaged sample is an average of a predetermined number of signal samples that are separated by a minimum pilot pattern repetition period from one to the next signal sample 1103; correlating the averaged samples with a reference sequence 1104; and comparing a correlation result with a threshold correlation value 1105. Based on the results of the comparison, the presence of a DVB can be determined.

The techniques described in this disclosure can be used in cognitive radios and other systems that rely on detect-and-avoid techniques for the detection of DVB-T/H signals or other OFDM signals that include defined pilot patterns.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for detecting the presence of a DVB (digital video broadcasting) transmission, comprising:
    receiving an RF (radio frequency) signal in a selected channel;
    creating signal samples from the received signal;
    creating averaged samples from the signal samples, each of the averaged samples being an average of a predetermined number of signal samples that are separated by a minimum pilot pattern repetition period from one to the next signal sample associated with the DVB transmission to be detected;
    correlating the averaged samples with a reference sequence stored in a memory, the reference sequence being a time domain sequence based on pilots associated with the DVB transmission to be detected; and
    comparing an output of the correlating a correlation result with a threshold correlation value to determine the presence of the DVB transmission.

2. The method of claim 1, further comprising:
    calculating a variation in periodicity of correlation peaks from in the correlation results output of the correlating; and
    comparing the variation with a threshold variation value.

3. The method of claim 1, wherein the minimum pilot pattern repetition period depends on the a transmission mode and a guard interval duration of the DVB signal.

4. The method of claim 3, further comprising determining the transmission mode by cycling through different transmission modes until the DVB signal is detected.

5. The method of claim 1, wherein the predetermined number of signal samples depends on a sensing time or desired performance levels.

6. The method of claim 1, wherein the number of averaged samples depends on how many samples can be accommodated during a quiet period.

7. The method of claim 1, wherein correlating the averaged samples with the reference sequence comprises taking logic operations on the signs of the averaged samples and the reference sequence.

8. A system for detecting the presence of a DVB (digital video broadcasting) transmission, comprising:
    an RF (radio frequency) front-end module for receiving an RF signal;
    a sampling module for creating signal samples from the received RF signal;
    a buffer for holding the signal samples;
    an accumulating/averaging module for creating averaged samples from the signal samples, each of the averaged samples being an average of a predetermined number of signal samples that are separated by a minimum pilot pattern repetition period from one to the next signal sample associated with the DVB transmission to be detected;
    a memory module for storing a reference sequence, the reference sequence being a time domain sequence based on pilots associated with the DVB transmission to be detected;
    a correlator for correlating the averaged samples with the reference sequence; and
    a threshold detection module for comparing a correlation result an output of the correlator with a threshold correlation value.

9. The system of claim 8, wherein the correlator is further configured to calculate a variation in periodicity of correlation peaks from in the correlation results output of the correlating, wherein the threshold detection module is further configured to compare the variation with a threshold variation value.

10. The system of claim 8, wherein the minimum pilot pattern repetition period depends on the a transmission mode and a guard interval duration of the DVB signal.

11. The system of claim 10, further comprising means for determining the transmission mode by cycling through different transmission modes until the DVB signal is detected.

12. The system of claim 8, wherein the predetermined number of signal samples depends on a sensing time or desired performance levels.

13. The system of claim 8, wherein the number of averaged samples depends on how many samples can be accommodated during a quiet period.

* * * * *